United States Patent [19]

Kerwin

[11] 4,248,655

[45] Feb. 3, 1981

[54] POSITION CONTROL SYSTEM FOR A MOVING WEB

[75] Inventor: Daniel Kerwin, Lombard, Ill.

[73] Assignee: The Meyercord Co., Carol Stream, Ill.

[21] Appl. No.: 44,494

[22] Filed: Jun. 1, 1979

[51] Int. Cl.³ .............................................. B32B 31/00

[52] U.S. Cl. .................................... 156/351; 156/361; 156/362; 156/363

[58] Field of Search ................ 156/351, 350, 361-364, 156/353-355; 226/2, 4, 24, 29, 108, 111; 53/51

[56] References Cited

U.S. PATENT DOCUMENTS

| | | | |
|---|---|---|---|
| 3,411,767 | 11/1968 | Moser et al. | 53/51 X |
| 3,583,128 | 6/1971 | Johnson et al. | 53/51 |
| 3,589,095 | 6/1971 | James et al. | 226/29 X |
| 3,928,115 | 12/1975 | Kerwin | 156/363 |
| 4,108,705 | 8/1978 | Hadl et al. | 156/355 |
| 4,154,639 | 5/1979 | Totten | 156/36 X |

*Primary Examiner*—David A. Simmons

*Attorney, Agent, or Firm*—Merriam, Marshall & Bicknell

[57] ABSTRACT

This disclosure relates to apparatus for controlling the positions of indicia on a moving web relative to the positions of a series of moving articles. The web has a series of spaced indicia on it, and the position of each indicium is matched or registered with the position of an article. First means is provided for sensing each indicium and generating a first signal indicative of the indicia, and second means is provided for sensing the articles and providing a second signal representative of each article. Third means is provided for generating a series of pulses in response to operation of a drive for the web. Counter means counts any pulses between occurrences of the first and second signals, such a count indicating a separation or disparity between positions of an indicium and an associated article. Speed control means operates in response to any such count to adjust the relative speeds of the articles and the web to obtain proper registration.

12 Claims, 1 Drawing Figure

POSITION CONTROL SYSTEM FOR A MOVING WEB

Figure 1:
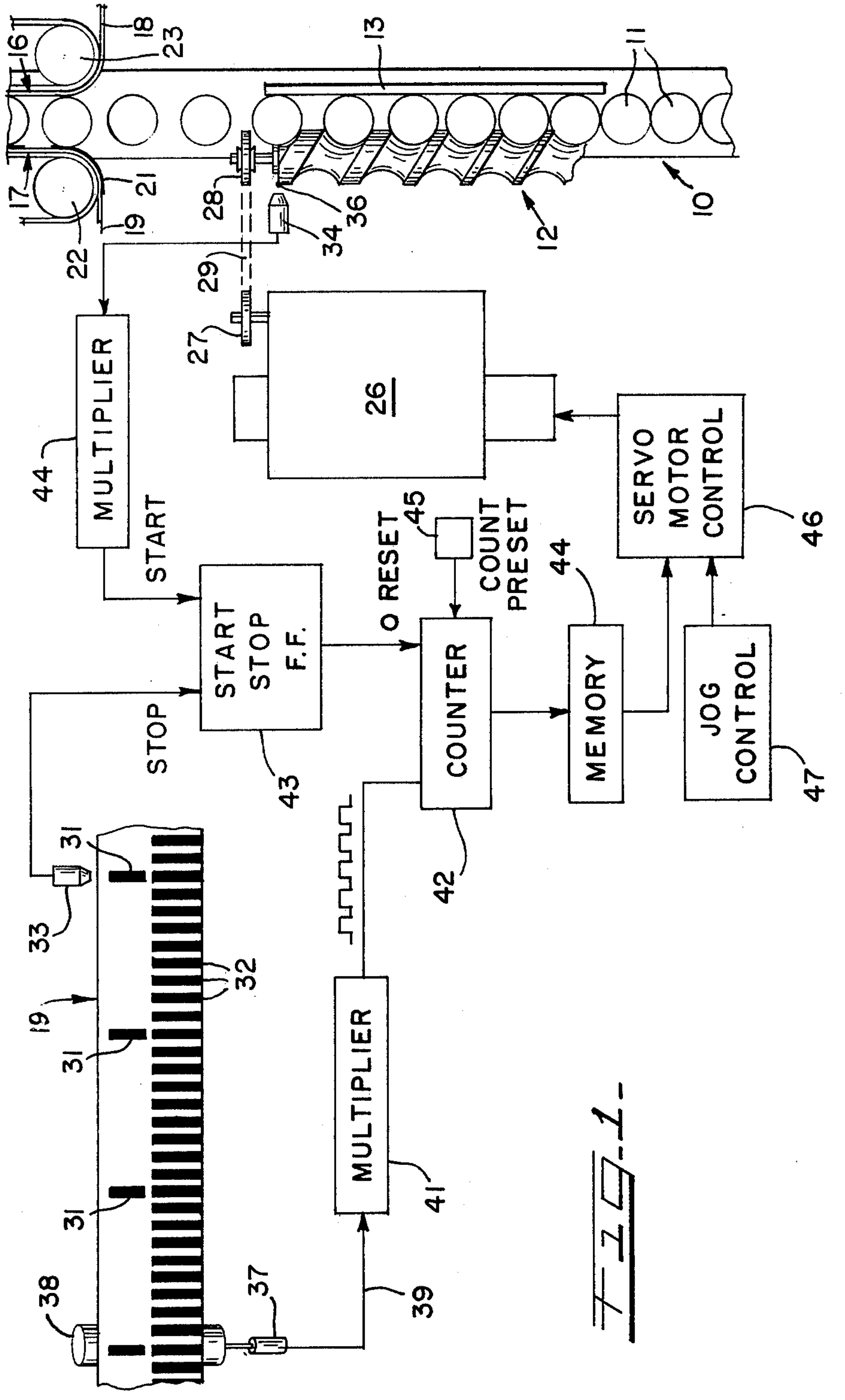

U.S. Pat. No. 3,928,115 issued Dec. 23, 1975, and copending U.S. patent application Ser. No. 949,527, disclose machines for applying indicia to general cylindrical articles at relatively high speeds. In both the machine shown in the patent and in the machine shown in the patent application, the indicia comprise a series of spaced decals formed on a web that engages and is moved by a moving drive belt. A series of articles are moved by a conveyor and a timing screw spaces the articles on the conveyor. The indicia on the web and the articles on the conveyor are moved in associated pairs through a channel where the decals are transferred from the web to the articles.

In such an arrangement, it is necessary for each article to be generally in registration or coincidence with the associated decal as they enter the channel. While this would appear to simply involve setting up the machine with the decals and the articles in registration and then running the web and the conveyor at related speeds in order to maintain the registration, such an arrangement would not be satisfactory. The web stretches during operation and the web tends to slip on the drive belt, and both factors cause the decals to shift out of registration relative to the articles. Any slight shifting of each decal becomes significant in such a machine because a large number of articles are handled every minute.

To adjust for such shifting in the machine shown in U.S. Pat. No. 3,928,115, the belt for the web is driven at a certain speed and the drive for the timing screw is adjustable between two speeds in order to vary the article spacing. In the arrangement shown in the application Ser. No. 949,527, the speed of the screw is continuously matched to the speed of the web. The arrangement of the application is satisfactory if the machine is properly set up with the articles and the decals in registration, but problems may arise if the operator does not properly set up the machine or also if the web has been spliced. Frequently a splice is made in a long web, which usually results in an irregular spacing between adjacent decals. Such a splice can upset the timing of the machine and a speed matching arrangement is not able to adjust for such a problem.

It is therefore a general object of the present invention to provide an improved system that avoids the foregoing disadvantages.

A system in accordance with the present invention is designed for use with a machine for applying indicia to a series of rapidly moving articles. The indicia are attached at spaced locations to a long web, and the articles are spaced on a moving conveyor by an article spacer. A drive is provided for the web and a separate drive is provided for the spacer. An indicia applying channel is provided where each indicium is transferred from the web to an associated article. The apparatus according to the invention comprises first sensor means responsive to each indicium passing it and moving to the channel, second sensor means responsive to each article passing it and moving to the channel, means responsive to said sensor means and any time interval between the presence of an article and the associated indicium, and means responsive to said time interval for adjusting the relative rates of movement of said web and said spacer to obtain registration between each article and the associated indicium.

The invention may be better understood from the following detailed description taken in conjunction with the single figure of the drawing, which shows a system embodying the invention.

With reference to the drawing, the system shown therein is useable in a machine of the character described in detail in applicant's U.S. Pat. No. 3,928,115 and in the machine disclosed in applicant's U.S. application Ser. No. 949,527, and the disclosures of the foregoing patent and patent application are incorporated herein by reference. In the following paragraph, the description of the basic machine parts include numbers in parentheses. The numbers in parenthesis are the reference numerals that appear in U.S. Pat. No. 3,928,115 and are provided to assist in understanding the construction and the operation of the present invention. However, although the invention is described in connection with the machines shown in the patent and the application referred to above, it should be understood that the present invention may have broader scope and is limited only as set out in the attached claims.

The machine includes a moveable conveyor or belt 10 (23) that carries a series of articles 11 (17). The articles 11 are generally cylindrical and may be beer bottles as described in the patent, tapered tumblers as described in application Ser. No. 949,527, etc. The conveyor 10 moves the articles 11 upwardly as seen in FIG. 1 to a timing screw 12 (41) which spaces the articles 11 on the conveyor 10. A guide rail 13 (36) maintains the articles 11 in the groove of the timing screw 12. The articles 11 are moved from the screw 12 by the conveyor to a channel 16 formed between a first belt 17 (71) and a second belt 18 (92). An elongated web 19 (15) is stretched across the belt 17 and extends through the channel 16, and a series of spaced indicia 21 (18) such as decals are formed on the web 19. The belt 17 is trained around a series of posts such as the post 22 (74) and the other belt 18 is trained around another plurality of posts including a post 23 (87). The two belts 17 and 18 are driven at generally constant speeds and the belt 18 moves at a slightly slower speed than the belt 17. As the articles move through the channel 16, they are pressed between the two belts 17 and 18, and since the belt 18 moves at a slightly slower speed than the belt 17, the articles 11 are turned on vertical axes and roll backwardly relative to the moving belt 17.

Each of the decals is associated with and applied to an article, and it is important that the associated article and decal enter the channel 16 in registration or timed relation. Each article 11 should enter the channel 16 at a time slightly ahead of the associated decal 21 to enable the article to be rolled backwardly across the associated decal.

The conveyor 10 is driven at a substantially constant speed during operation of the machine from the main drive (not shown), and the timing screw 12 is separately driven from an electric motor and gear box drive 26. The drive 26 is connected to the timing screw 12 by two sprockets 27 and 28 and by a chain 29. The drive 26 turns the screw 12 to feed articles toward the channel 16 and it will be apparent that the spacing between adjacent articles 11 as they leave the timing screw is a function of the rate of rotation of the screw 12 relative to the rate of movement of the conveyor 10. The posts 22 are turned by the main drive and move the belt 17 at a generally constant speed. The web 19 is frictionally engaged and moved by the belt 17, and the decals 21 are on the front side which faces the articles 11. Normally the decals are spaced at regular intervals on the web 19 and the decals 21 on the web 19 enter the channel 16 at generally constant time intervals because the web is carried by the belt 17 that moves at a fixed speed. However, as previously mentioned, the web 19 may shift on the belt 17. Therefore the registration or coincidence between each article 11 and the associated decal 21 may be obtained by adjusting the rate of rotation of the screw 12 in order to adjust the spacing between adjacent articles 11 entering the channel 16. In accordance with the present invention, such registration is attained by sensing the decals 21 as they move toward the channel 16, sensing the articles 11 as they move toward the channel 16, and if necessary, adjusting the speed of the timing screw 12 in order to vary the positions of the articles 11 entering the channel.

The front side or face of the web 17 has the decals 21 formed on it at spaced intervals as previously mentioned. To enable the present control system to sense the decals, a series of marks 31 are formed on the backside of the web 17, one of the marks 31 being associated with and located behind each of the decals. In addition to the marks 31, in the present specific example, a second series of marks 32 are formed on the backside of the web, the marks 32 corresponding to the marks 110 described in pending application Ser. No. 949,527 and being utilized to control the relative speeds of the timing screw and the web as described in application Ser. No. 949,527.

A system in accordance with the present invention comprises a first sensor 33, which may be a photocell sensor, positioned adjacent the web 17 and adapted to respond to each of the marks 31. Since each mark 31 is associated with a specific decal on the web, the photocell 33 may be considered to respond to each decal moving toward the channel 16. The system further comprises a second sensor 34 mounted adjacent the screw 12. A mark 36 is formed on the screw 12, and the sensor 34 responds to the movement of the mark 36 past it. Again, the sensor 34 may be a photoelectric cell. In the present specific example, the screw 12 makes one complete revolution for each article 11 leaving it, and therefore the mark 36 will result in one signal or pulse from the photocell 34 for each article 11 leaving the timing screw. The distances of the two photocells from the entrance to the channel 16 are such that a pair consisting of an article and a decal moving past the sensors in timed relation will also enter the channel 16 in timed relation. Thus, the two sensors 33 and 34 sense the movements of an associated pair of decals and an article toward the channel 16.

In addition to the two sensors 33 and 34, the system further includes a pulse generator 37 that is connected to generate pulses in response to movement of the belt and the web. In the present example, the generator 37 is connected to a drive roller or wheel 38 of the drive for the web 17. Turning of the wheel 38 and the sensor 37 generates a series or train of pulses on a line 39. The train of pulses on the line 39 from the generator 37 is preferably multiplied by a multiplier circuit 41 to increase the frequency, and the multiplier 41 output is connected to a signal input of a counter 42.

The decal sensor 33 for the marks 31 has its output connected to a stop input of a start-stop flip-flop circuit 43, and the article sensor 34 has its output connected through a multiplier circuit 44 to the start input of the flip-flop 43. A pulse from the sensor 34 sets the flip-flop 43, and an output of the flip-flop 43 is connected to a control input of the counter 42. Thus, when the flip-flop 43 is in its set condition, the counter 42 is enabled to count the pulses received from the multiplier 41. A subsequent signal from the sensor 33 resets the flip-flop 43 which in turn disables the counter 42. Consequently, the counter 42 counts pulses from the multiplier circuit 41 only in each time interval between signals from the two sensors 33 and 34. Each time the counter is reset, the count in the counter is read out to a memory register 44 which holds the count while the counter 42 is making the next subsequent reading or count, and the register 44 is updated by the counter 42 after each new count. The count stored in the register 44 is fed to a servo motor control circuit 46 which controls the speed of the servo drive 26 for the timing screw 12.

It is preferred that the counter 42 have a fixed or initial count preset in it by a preset circuit 45, and the preset count be added to the count of the generator 37 pulses. The servo motor control circuit 46 is adjusted to control the web position to maintain the preset count value. For example, if the counter 42 were given a certain preset count and if the position of the screw 12 were slightly ahead of the position of the associated mark 31, the start signal from the sensor 34 would appear at the flip-flop 43 slightly ahead of the stop signal from the sensor 33. Consequently, the counter 42 would be enabled for a short time interval and a count would be added to the preset count. With the control circuit 46 adjusted to maintain the preset count, the speed of the motor 26 would be slowed slightly to eliminate the time interval and to return to the preset count. Conversely, if the timing screw 12 were slightly behind the associated decal, the count output of the counter 42 would be slightly less than the preset count and the timing screw 12 would be speeded up slightly. In either event, the control 46 would momentarily adjust the speed of the screw 12 in order to adjust the relative positions of the articles and the decals to maintain the proper registration or coincidence as they enter the channel 16. The magnitude of the count is determined by the time interval and the disparity between the relative positions, and the control 46 adjusts the motor speed by an amount that is proportional to the magnitude of the count.

A manually operable jog control 47 is preferably also connected to the servo motor control 46 to enable an operator to achieve proper registration at startup. When the operator 47 actuates the jog control 47, a signal similar to that from the register or memory 44 is provided to the servo motor control 46 and indicates a large error in the positions of the articles and the decals. This relatively large error signal causes the servo motor control 46 to rapidly adjust the speed of the motor 26 to bring the positions of the articles 10 into registration with the positions of the decals 21. A system without the jog control 47 would of course operate to bring the articles and the decals into proper registration, but it would take longer than the time required for the jog control 47 to bring the positions into registration.

It will be apparent that the system provides means (sensor 33) responsive to the positions of the decals 21, means (sensor 34) responsive to the positions of the articles, means (generator 37, flip-flop 43 and counter 42) responsive to any time interval due to a disparity in positions, and means (control 46 and drive 26) for adjusting the relative speeds to obtain proper registration. The sensors are not required to be photocells, and they may be arranged to sense the decals and the articles directly. It is preferred that the positions be adjusted by changing the screw speed, but of course the web speed could momentarily be adjusted instead.

While each article enters the channel with an associated decal, it is not essential that the sensors be located to sense the article and decal of an associated pair. For example, the decal sensor 33 could be displaced by a distance of one decal. It is not even necessary for the sensors to be precisely located to sense the positions at related distances from the entrance to the channel 16, because the pulse counter and control circuits may be adjusted to accommodate unrelated spacing. As an example of such an arrangement, if the sensor 33 were offset from the related position with the result that there would be a time interval during which pulses would be counted by the counter 42 due to an apparent disparity in positions, even though the associated pairs were in proper registration, the counter preset 45 may be adjusted to offset the count by an amount that compensates for the offset in position.

The position control system disclosed herein may advantageously be used with the speed control system disclosed in the previously mentioned patent application. The speed control system would maintain the desired relative speeds while the present position control will adjust the positions at, for example startup, or if the proper positioning is lost during operation due to a splice, a misprint or missing marks.

The pulse generator 37 is driven in timed relation with the web drive and the web 19, and this is especially advantageous in a machine having a variable speed main drive. The main drive is connected to the web drive belt 17 and to the belt 18 and to the conveyor 10, and therefore these parts are always driven in synchronism. The screw 12 is of course driven separately by the servo motor drive 26. Where the main drive speed is variable, the connection of the reference pulse generator 37 to the web drive results in the screw speed 12 being automatically related or tied to the adjustment of the main drive speed. The pulse frequency of the generator 37 is a function of the main drive speed and therefore the magnitude of any error signal is also a function of the main drive speed. The position control system disclosed herein will therefore automatically adjust the screw speed when the main drive is adjusted.

It will be apparent from the foregoing that a new and useful system has been provided for adjusting the relative positions of the articles and the decals. The system responds to the positions of the decals and the articles and adjusts the positions by changing the spacing of the articles relative to the decals, by a relatively simple but effective arrangement. Since the system responds to the positions of the decals and the articles, there is no chance for error in the system.

What is claimed is:

1. A system for use in a machine for applying indicia to a series of articles, the indicia being spaced on an elongated web and the articles being moved on a conveyor and spaced on said conveyor by spacing means, the machine including a drive means for the web and for the spacing means, the indicia and the articles being fed in associated pairs to a channel where the indicia are transferred from the web to the articles, said apparatus comprising first sensor means responsive to said indicia moving to said channel, second sensor means responsive to said articles moving to said channel, means responsive to said first and second sensor means and determining the length of any time interval between an indicium and an associated article, and control means responsive to the length of said time interval for adjusting the relative positions of said indicia and said articles to obtain registration between the indicium and the article of each pair.

2. A system as in claim 1, wherein said control means adjusts the positions of said articles.

3. A system as in claim 1, wherein said control means adjusts said relative positions to eliminate said time interval.

4. A system as in claim 1, and further including jog means connected to said control means for effecting a rapid adjustment of said relative positions.

5. A system as in claim 1, wherein said first sensor means comprises photoelectric means responsive to said indicia.

6. A system as in claim 1, wherein said means responsive to said first and second sensors is further responsive to said drive means, and said length of any time interval is also a function of the speed of said drive means.

7. A system for use in a machine for applying indicia to a series of articles, the indicia being spaced on an elongated web and the articles being moved on a conveyor and spaced on said conveyor by spacing means, the machine including a drive means for the web and for the spacing means, the indicia and the articles being fed in associated pairs to a channel where the indicia are transferred from the web to the articles, said apparatus comprising first sensor means responsive to said indicia moving to said channel, second sensor means responsive to said articles moving to said channel, means responsive to said first and second sensor means and determining any time interval between an indicium and an associated article, control means responsive to said time interval for adjusting the relative positions of said indicia and said articles to obtain registration between the indicium and the article of each pair, said means responsive to said sensor means comprising means generating a train of pulses, a counter connected to receive said pulses, one of said sensor means being connected to enable said counter and the other of said sensor means being connected to disable said counter, whereby any count in said counter is a function of said time interval.

8. A system as in claim 7, and further including means for presetting a count in said counter.

9. A system as in claim 8, wherein said control means adjusts said relative positions to maintain said preset count.

10. A system as in claim 7, wherein said means generating a train of pulses comprises a pulse generator connected to said drive for said web.

11. A system as in claim 10, wherein said train of pulses has a frequency that is a function of the speed of said main drive.

12. A machine for applying indicia to a series of articles, the indicia being spaced on an elongated web, the machine comprising a conveyor and the articles being moved on the conveyor spacing means for spacing the articles on said conveyor, drive means for the web and for the spacing means, decal applying channel means, the indicia and the articles being fed in associated pairs to said channel means where the indicia are transferred from the web to the articles, first sensor means responsive to said indicia moving to said channel, second sensor means responsive to said articles moving to said channel, means responsive to said first and second sensor means and determining the length of any time interval between an indicium and an associated article, and control means responsive to the length of said time interval for adjusting the relative positions of said indicia and said articles to obtain registration between the indicium and the article of each pair.

* * * * *